(12) United States Patent
Gabler et al.

(10) Patent No.: US 8,021,504 B2
(45) Date of Patent: Sep. 20, 2011

(54) QUALITY CONTROL METHOD FOR ULTRASOUND WELDING

(75) Inventors: Jorg Gabler, Frankfurt (DE); Holger Warzelhan, Laubach (DE); Jost Eberbach, Buseck (DE)

(73) Assignee: Schunk Sonosystems GmbH, Wettenberg (DE)

( * ) Notice: Subject to any disclaimer, the term of this patent is extended or adjusted under 35 U.S.C. 154(b) by 338 days.

(21) Appl. No.: 12/440,978

(22) PCT Filed: Sep. 11, 2007

(86) PCT No.: PCT/EP2007/059537
§ 371 (c)(1),
(2), (4) Date: Mar. 12, 2009

(87) PCT Pub. No.: WO2008/031823
PCT Pub. Date: Mar. 20, 2008

(65) Prior Publication Data
US 2009/0314412 A1   Dec. 24, 2009

(30) Foreign Application Priority Data
Sep. 16, 2006  (DE) .................. 10 2006 043 605

(51) Int. Cl.
*B32B 37/00* (2006.01)
(52) U.S. Cl. ........................................ 156/64; 156/73.1

(58) Field of Classification Search ............... 156/64, 156/73.1, 358, 580.1, 580.2; 228/102, 103, 228/110.1, 8, 9, 1.1; 700/212, 299, 300, 700/301, 302
See application file for complete search history.

(56) References Cited

U.S. PATENT DOCUMENTS

| | | | |
|---|---|---|---|
| 4,341,574 A * | 7/1982 | Landes | 156/64 |
| 4,631,685 A * | 12/1986 | Peter | 700/212 |
| 4,815,001 A | 3/1989 | Uthe | |
| 5,213,249 A * | 5/1993 | Long et al. | 228/102 |
| 6,308,881 B1 * | 10/2001 | Hesse et al. | 228/102 |
| 7,686,204 B2 * | 3/2010 | Takahashi et al. | 228/103 |

* cited by examiner

*Primary Examiner* — James Sells
(74) *Attorney, Agent, or Firm* — Dennison, Schultz & MacDonald

(57) ABSTRACT

A quality control method for ultrasound welding. The method provides for the generation of a tolerance range which is adjusted to the progress of the welding process and which is generated from measured values which influence the welding process. A measured value tolerance range is determined from measured values of executed welding processes, the measured values being associated with at least one parameter which influences the welding process and/or represents the goods of the welding process. Measured values are associated with an identical parameter of a further welding process following thereafter and are considered during the quality monitoring in such a way that the measured value tolerance range is changed in its form or composition to an average value for further welding processes, in accordance with the variance between the additional measured values and the tolerance range determined from previous measured values.

11 Claims, 3 Drawing Sheets

QUALITY CONTROL METHOD FOR ULTRASOUND WELDING

Figure 1A:
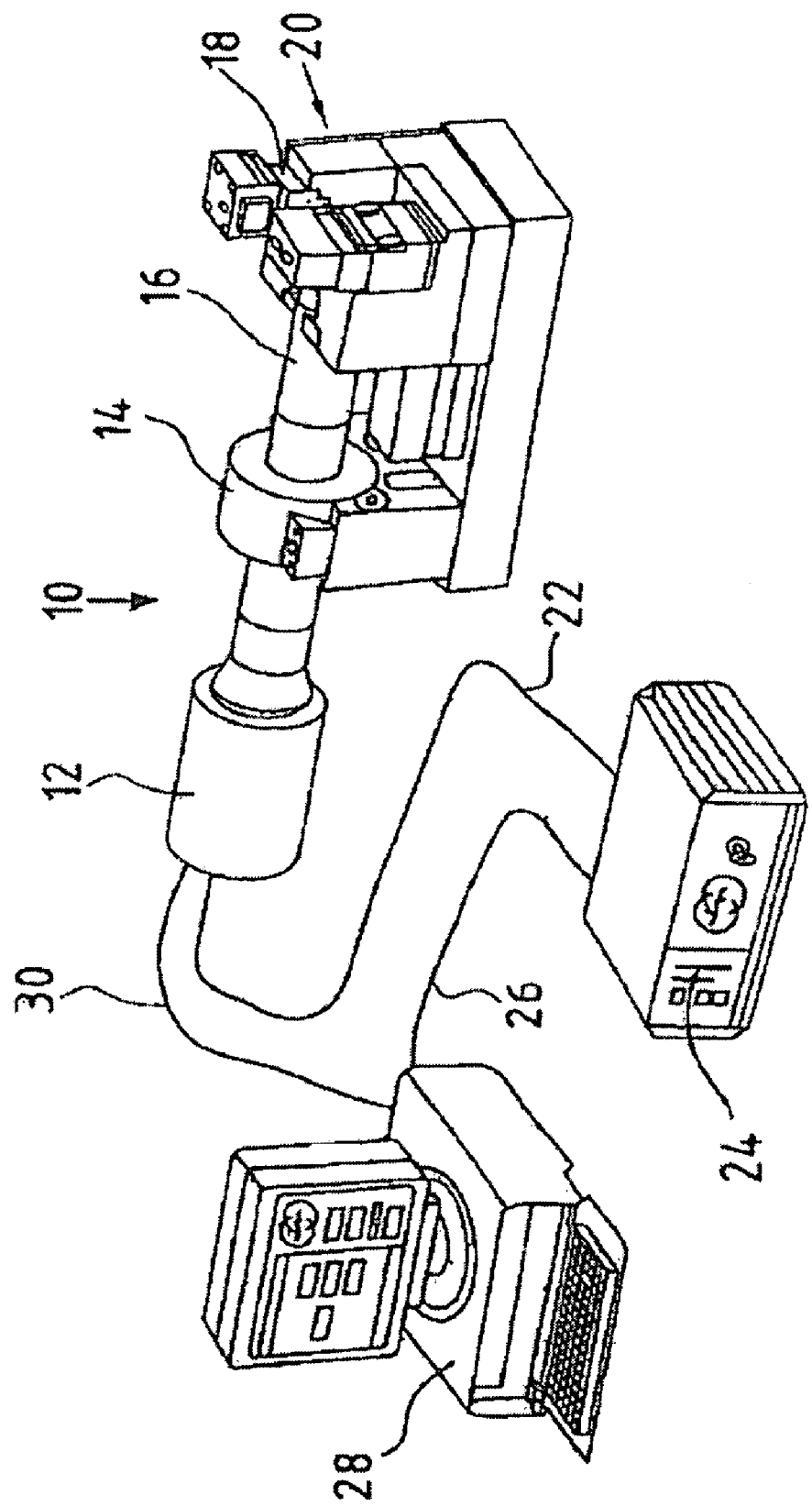

The invention relates to a method of quality control in ultrasound welding, in which a measured value tolerance range is determined from measured values from executed welding processes, said measured values being associated with at least one parameter that influences the welding process and/or represents the quality of the welding process, wherein measured values that are assigned to the same parameter in subsequent welding processes are taken into consideration in quality control.

Ultrasound welding is a proven effective process for joining thermoplastics. Modern ultrasound welding devices used in plastics engineering enable precise and reproducible welds to be generated through the use of digital generator technology and microprocessors. In identifying parameters for different applications and materials, empirical values are customarily consulted. Sets of parameters are also empirically developed—frequently with software support. Even if the weld is inherently reliable and stable, problems exist in the quality control of the joining process, as frequently, required standards of quality and necessary welding parameters cannot be correlated. In practice, so-called SPC (statistical process control) programs are customarily used.

In such cases, welded pieces are inspected to determine whether they meet the stated requirements. Standards of quality in this case may include bond strength, dimensional stability, density, results of drop weight or impact tests, and visual inspection results. Apart from the external visual inspection, the majority of parameters to be determined require destructive testing. In these cases, the data from the tested materials are input into an SPC program, in order to obtain information regarding processability, rejection rates, etc. Thus, although process data are recorded and evaluated, no real process control is performed.

A further disadvantage of this type of inspection method is that destructive testing interferes with series production, so that evaluation can be conducted only via random sampling. A one hundred-percent inspection is possible only with non-destructive processes.

From WO-A-2004/096480 a process specifically for welding stranded wires is known, in which time-dependent welding parameters are controlled by adjusting them to target values during the welding process. To accomplish this, an actual curve of the time-dependent parameter is measured and compared with a setpoint curve. At least one process parameter is controlled within the scope of the deviation.

From DE-A-44 29 684, a method of welding electrical conductors of the type initially specified is known. In this case, the characteristic parameters for compacting and/or welding in welds to be generated are dynamically adjusted to those of the previous compression and/or welding. Welding results that lie within firmly preset value ranges are evaluated as good quality welds, and those that lie outside of these ranges are evaluated as poor quality welds. The width of the tolerance range remains constant, wherein the course of the mean value that corresponds to the measured results obtained from the welds can change.

To control and/or regulate process parameters in the ultrasound welding of plastic components, DE-A-43 21 874 provides for the joining force to be measured during the welding process, in order to monitor the energy applied to the joint between the components to be welded.

According to EP-B-0 567 426, the vibration amplitude of a sonotrode with which plastic components are welded is reduced after a predetermined time interval, so that welding can be performed at a decreased vibration amplitude during the remaining welding period. An associated control signal for reducing the amplitude can also be generated directly or indirectly, based upon the power transmitted to the workpieces to be welded, as is described, for example, in WO-A-98/49009, U.S. Pat. No. 5,855,706, U.S. Pat. No. 5,658,408 or U.S. Pat. No. 5,435,863.

From WO-A-02/098636 a method of welding plastic components is known, in which to optimize the welding process, the vibration amplitude is reduced during a first time interval along a preset course, so that measurements can be performed using a characteristic parameter of the work piece, after which, based upon the value of the measured parameter, the welding process can be completed using a sonotrode having a constant amplitude, which transmits ultrasound energy.

To inspect bonds generated via ultrasound wire bonding, DE-A-101 10 048 provides for an on-line inspection based upon preset and/or stored master values, which enable conclusions to be drawn regarding the strength of the bond.

The object of the present invention is to further improve upon a method of the type initially described such that a more sensitive monitoring of process steps than is possible with the prior art is enabled, allowing corresponding parameter changes to be made that will produce higher quality welding results or will enable an adjustment to process conditions, ensuring that high quality welds can be achieved within the necessary parameters. This method should be readily usable in series production.

According to the invention, the object is attained substantially in that, based upon deviations of subsequent measured values from the tolerance range determined from previous measured values, the measured value tolerance range for subsequent welding processes is especially dynamically adjusted in terms of its configuration or in terms of its position in relation to a mean value. In this process, the change in the tolerance range can be made continuously or after a predetermined number of welds. The latter alternative can result in stepped changes in the course and/or width of the tolerance range.

A change in configuration includes a change in the width of the tolerance range, but also a change in course in relation to a mean value, for example with a distribution that deviates from the normal distribution.

The stepped change is caused when, after a number x of welds, with x=1,000, for example, the tolerance range is examined, so that its width can be adjusted, if necessary. In this manner, temporary, potentially uncharacteristic fluctuations are prevented.

According to the invention, a dynamic tolerance adjustment in the tolerance width, and therefore the tolerance, takes place, with relevant characteristic values of the welding process being used as a basis. In this, the tolerance range can be decreased or increased in width. A decrease in the size of the tolerance range occurs when the measured values indicate that the mean variation of the characteristic value assigned to the good quality weld results in a tolerance range that is smaller than the originally predetermined range. The quality of the welded pieces to be produced is thereby improved.

If the size of the tolerance range is increased based upon the measurements of the characteristic values performed, this must take into consideration the secondary condition that a threshold value which indicates whether welded pieces should be characterized as good or poor quality pieces may not be exceeded.

The initial tolerance range is established after an initial run of n welds, wherein the number n is chosen such that a statistically supported value can be assumed. The value n can be chosen from the exemplary list of numbers 33, 100, 300, 500 or 1,000, for example.

In this, a statistically supported value is intended to ensure the exclusion of extreme values. Especially in the teach mode, a statistically relevant quantity chosen by the operator is taken into account for reference welds. In this case, a statement regarding mean value and tolerance range width is more precise, the more extensive the quantity of data.

The change in the position of the tolerance range in relation to a mean value is understood such that, based upon inspections, a distribution configuration that deviates from a standard deviation, such as Gaussian distribution, is identified, in other words more negative than positive deviations are identified, for example, so that the tolerance range is adjusted accordingly.

It is especially provided that, to determine a tolerance range, the duration of the welding process to which a predetermined input of energy into the welded component is allocated is measured. Thus a window of time which corresponds to the tolerance range is established, thereby allowing conclusions to be drawn regarding the quality of the weld.

Intervals of time during which a relative adjustment between the sonotrode and the counter electrode of a device used to perform ultrasound welding is made may also be chosen as measured values for determining a tolerance range.

As additional windows of time for determining a tolerance range, those within which a predetermined weld force is applied should be chosen.

All of these characteristic variables for the welding process can be applied to determine a tolerance range, so as to allow sensitive reaction to changes in material properties, welding surfaces of sonotrode and counter electrode, movements in the adjustment of these, or energy input, for example, based upon the completed and measured welds, in other words to enable control and/or influence over the process in such a way that higher quality welds can be produced.

According to the invention, weld data and specific quality characteristics are correlated, thereby influencing the quality of the welded component after joining. A sensitive process control is implemented, wherein a tolerance range for measured values that influence the welding process is generated, and is adjusted to the continued welding process.

The tolerance range is preferably adjusted automatically; however it may also be adjusted manually. Regardless of this, monitoring takes place automatically in the background of the welding processes. It is also possible for an alarm to be triggered when welded components lie outside of the tolerance range, so that it can be determined on an individual basis whether the product will be declared as scrap or will be subjected to further inspection.

According to the invention, the standard deviations identified during reference welding processes, which relate to the reference quantity, are adjusted to occurring tolerances during the actual production process. For this purpose, process variables are collected during the welding process, to allow new tolerances to be calculated and stored continuously or after a predetermined number of welds have been generated. If the tolerance range is decreased as a result of this step, the sensitivity of the monitoring is increased, and product quality is thereby improved.

The following represent examples of parameters to be taken into consideration in identifying tolerance ranges, in accordance with the teaching of the invention:

Trigger force—the force during positioning on a component, taking into account the weight of the vibrator for switching on the ultrasound, Weld force—the force required to reshape the component during the welding process, Amplitude—the welding amplitude used to fuse the plastic, as a percentage, Holding force—the force applied after completion of the welding process for cooling the plastic, Holding time—the span of time during which the welded component is held under holding force.

Apart from these, maximum power levels, energy input, welding time, trigger point and absolute adjustment path may also be taken into consideration as welding parameters.

In a further, emphasized embodiment of the invention, it is provided that the change in the tolerance range is itself monitored in that welds having measured values that lie within the tolerance range are inspected to determine their quality.

If it should be determined that, although the measured values of pieces lie within the tolerance range, the corresponding welded pieces are of inferior quality, the operator can still implement a change in the tolerance range accordingly.

Additional details, advantages and characteristics of the invention are specified not only in the claims and the characterizing features described in these—alone and/or in combination—, but also in the following description of preferred exemplary embodiments represented in the set of drawings.

Figure 1B:
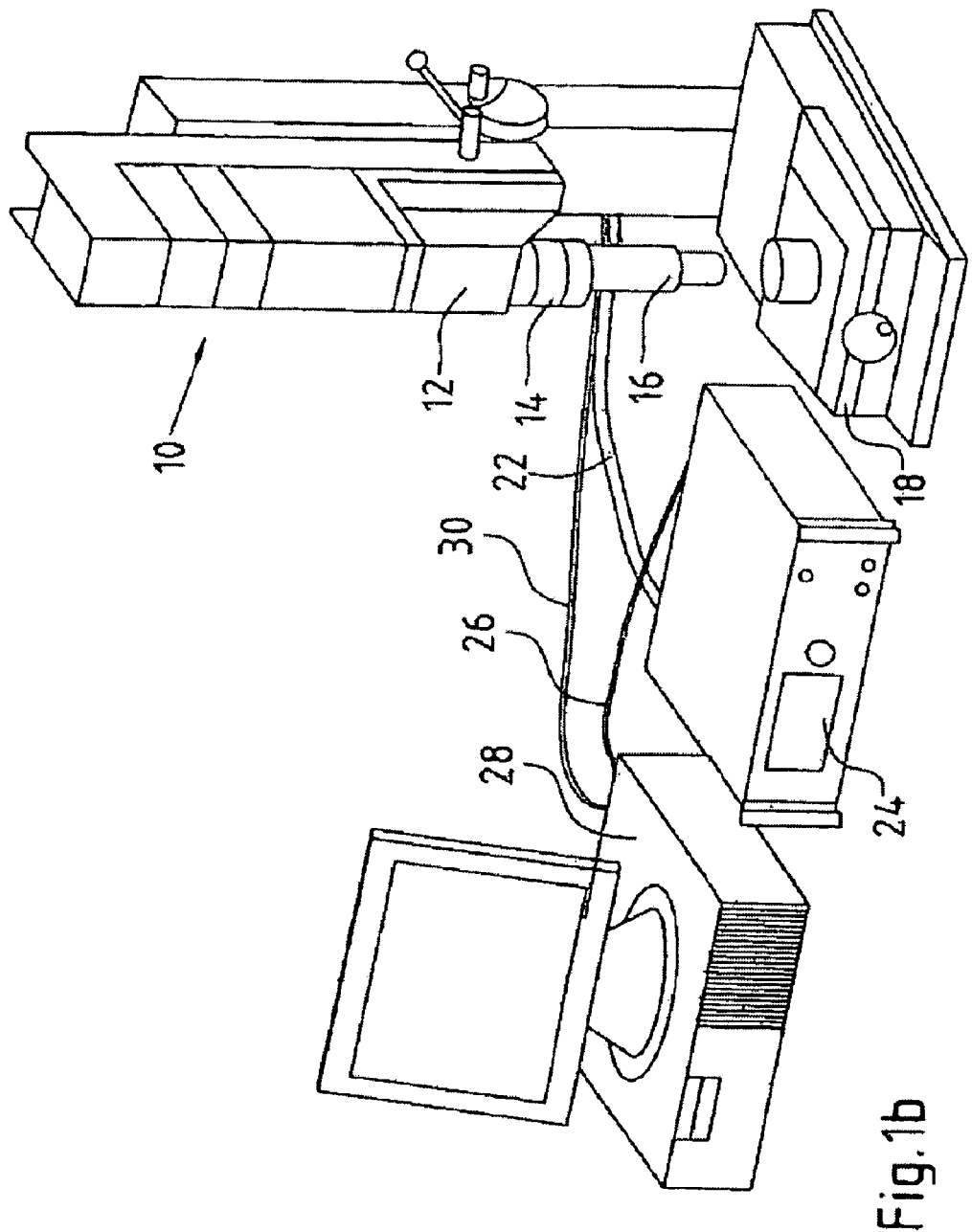
Figure 3:
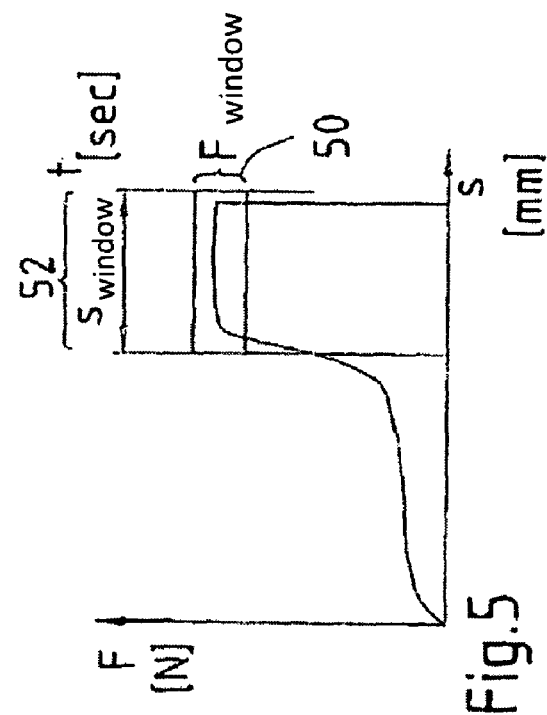
Figure 5:
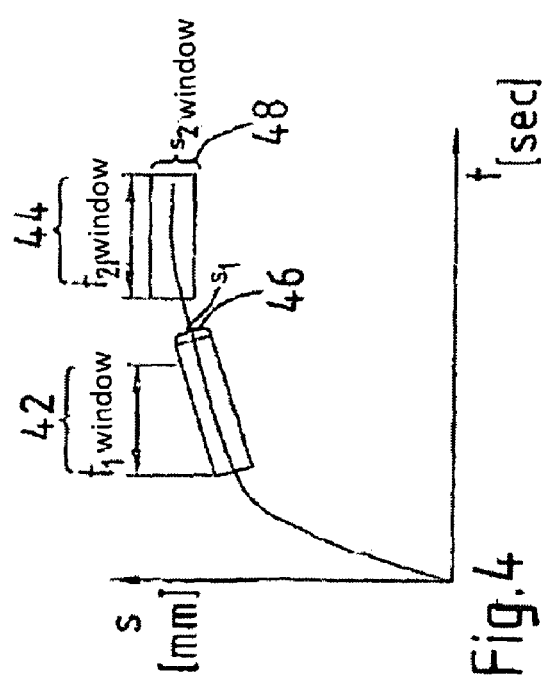
Figure 2:
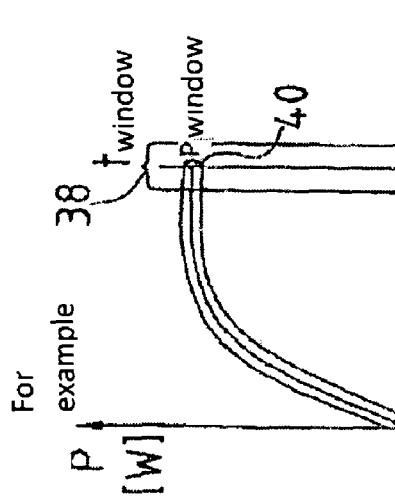
Figure 4:
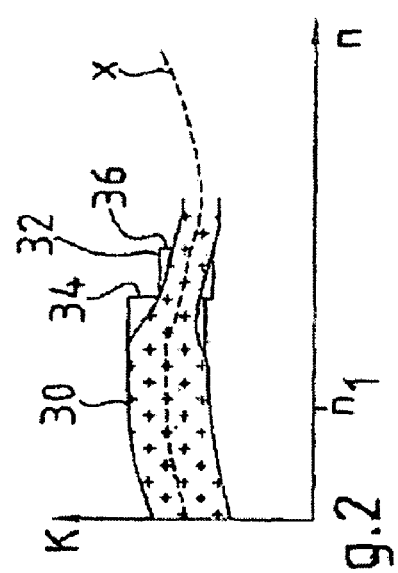

The drawings show:

FIG. 1a a representation of the principle of an ultrasound welding device for metal welding, FIG. 1b a representation of the principle of an ultrasound welding device for plastic welding, FIG. 2 a representation of the principle of a tolerance range, FIG. 3 a power level/time diagram, FIG. 4 a path/time diagram and FIG. 5 a force/path diagram.

FIGS. 1a and 1b illustrate the principle of assemblies with which strands in the exemplary embodiment of FIG. 1a and plastic pieces in the exemplary embodiment of FIG. 1b are welded using ultrasound, wherein, based upon characteristic values for welding processes, quality control and optimization of the welding processes can be performed. The teaching of the invention is not limited to the welding of metals. Rather, the invention also comprises plastic welding.

An ultrasound welding device or machine 10 of FIG. 1a comprises, in the known manner, a converter 12, optionally a booster 14, and a sonotrode 16. A counter electrode 18 is allocated to the sonotrode 16, or a surface thereof, and can be comprised of multiple pieces, in accordance with the teaching of U.S. Pat. No. 4,596,352 or U.S. Pat. No. 4,869,419, in order to create a compression space 20 that is optionally adjustable in cross section, in which the conductors to be welded are inserted. The converter 12 is connected via a line 22 to a generator 24, which is in turn connected via a line 26 to a computer 28, which allows the input or retrieval of welding parameters or cross-sections of the conductors to be welded.

The assembly of FIG. 1b differs from that of FIG. 1a in that, for welding plastic components, the longitudinal axis of the sonotrode 16 extends perpendicular to the pieces to be welded, in other words the vibrations are introduced from a vertical direction.

In both embodiments, process detection is carried out via a control line 30, to enable a dynamic adjustment of tolerance values for relevant characteristic variables of the welding process, according to the teaching of the invention. This will be described in greater detail in reference to FIGS. 2 and 4.

To allow a welding process to be dynamically and continuously monitored during welding, weld data are correlated with specific quality characteristics and their effects on the quality of the component after a joining process. For instance, in FIG. 2 a characteristic weld variable k is plotted in principle over the number n of welds performed. Examples of characteristic weld variables include energy input, duration of welding, trigger point, path of adjustment between sonotrode and anvil, trigger force, weld force, holding force, holding time and amplitude, for example. One characteristic variable can be considered alone, or several characteristic variables can be considered in combination.

Whether a welded piece is characterized as a good or poor quality piece depends upon whether the determined characteristic variable lies within a tolerance range 30. The tolerance range 30 is varied based upon the measured values for the characteristic variable obtained during the welding process, to allow sensitive reaction to changes, regardless of whether these relate to the materials to be welded, or, for example, the hardware such as the sonotrode, the anvil, the weld surface or the ultrasound welding device 10.

Prior to the start of welding in the production process, in the teach mode, a statistically relevant number $n_1$ of reference welds are performed. In this connection, the greater the quantity of data, the more precisely the width of the tolerance range 30 can be established. In this, a normal distribution is ordinarily assumed, i.e., the tolerance range extends the same distance on both sides of a mean value x. Once the initial tolerance range, which encompasses the $n_1$ welds, has been identified, the welding processes relevant to production are performed. In this, process variables, i.e., characteristic welding variables, are automatically collected in the background of production, and from these measured values (production data) new tolerances are continuously calculated and stored in the background, in other words in the computer 28. If it is found, according to the representation of FIG. 2, for example, that the measured values of the characteristic weld variable k are more narrowly dispersed than during the reference welds, the tolerance range is adjusted accordingly, specifically its width is decreased, as is illustrated by the area 32 in FIG. 2. Thus the quality of the welded pieces can be increased because the tolerance is decreased.

Of course, the size of the tolerance range can also be increased based upon production, without poor quality welds resulting. This is prevented by setting a maximum limit for the width of the tolerance range. Welds that lie within the maximum tolerance range can be qualified as good quality welds.

Apart from this, according to the invention, the tolerance range 30 can itself be monitored by inspecting one or more welds, the characteristic weld values of which lie within the tolerance range 32, to ensure that the desired weld quality is also achieved.

Whereas in FIG. 2 a continuous adjustment of the tolerance range is indicated, a stepped change can also occur. This means that the tolerance band is inspected and any necessary adjustment is made only after a predetermined number of welds have been generated. This is indicated in FIG. 2 by the stages 34, 36.

Additional examples of a tolerance range adjustment for process sequences are found in FIG. 3-5, in which a two-parameter change can occur.

In FIG. 3, for example, power P is plotted over time t. In this case, an adjustment to the tolerance range width with respect to the power P and/or the time t can be made. A time adjustment in this case means that a window of time 38 is established, within which a predetermined amount of energy must be applied to the weld material. If the energy application lies within the window of time 38, the welded material is evaluated as a good quality piece. If the application of energy ends outside the window of time 38, the welded piece is classified as a poor quality weld. The width of the window 38 is varied based upon the measured values, whereby a sensitive adjustment of the welding processes to be performed is made.

In the same manner, a tolerance range for the power P can also be predetermined, which is characterized in FIG. 3 as P window 40. The energy input that characterizes a welded piece as a good quality piece must then occur at the time $t_E$ in consideration of the tolerance.

In FIG. 4, a path/time diagram is presented, wherein the path S plotted over the time t illustrates the relative adjustment between sonotrode 16 and anvil 18 of the ultrasound welding device 10, in principle. The shape of the curve indicates corresponding compression and/or welding processes that can be used to characterize the quality of a weld. These areas can be assigned tolerance ranges, to thereby enable a control of the welding process that will ensure the generation of high quality welds. Thus in FIG. 4, two windows of time 42, 44 are plotted, which identify the ranges in which the pieces to be welded are compressed (time window 42) or the welding is completed (time window 44).

Each respective window of time 42 and 44 therefore represents a tolerance range which detect, based upon the measured values that relate to the adjustment of sonotrode 16 and anvil 18 in relation to one another.

In place of or as an alternative to the windows of time 42, 44, a path window 46 or 48 for influencing or controlling the welding process can be chosen. In this case, measured values must lie within the path windows 46, 48, in which the compression of the pieces to be welded is detected, or the welding is completed, assuming the pieces are of good quality.

FIG. 5 shows a force/path diagram, which is characteristic, for example, of the production of a terminal junction for electric conductors. Thus windows associated with the force and/or with the adjustment path can be established, which are identified in FIG. 5 by the reference symbols 50 and 52, respectively. Here, an area that is characteristic of a welding process is chosen in the corresponding force/path curve, in the present case that of welding, in other words the adjustment of sonotrode 16 and anvil 18 in relation to one another during ultrasound excitation. Based upon the change in path, which represents the welding process, the applied forces are measured, to thereby determine a tolerance range. In other words, the windows 50, 52 correspond to the width of tolerance ranges, which can be dynamically changed and/or adjusted during production, based upon the measured characteristic variables of force and/or path, in order to achieve optimum welding results.

The invention claimed is:

1. Method of quality control in ultrasound welding, in which a measured value tolerance range is determined from measured values from executed welding processes, said measured values being associated with at least one parameter that influences the welding process and/or represents the quality of the welding process, wherein measured values that are assigned to the same parameter in subsequent welding processes are taken into consideration in quality control, characterized in that, based upon deviations of the subsequent measured values from the tolerance range established using the previous measured values, the measured value tolerance range for subsequent welds is adjusted in terms of its configuration or in terms of its position in relation to a mean value.

2. Method in accordance with claim 1, characterized in that the change in the tolerance range occurs continuously.

3. Method in accordance with claim 1, characterized in that the change in the tolerance range is made after a predetermined number of welds have been generated.

4. Method in accordance with claim 1, characterized in that the change in the tolerance range is monitored by evaluating welded pieces, wherein weld parameters are assigned to the welds of said pieces, with said parameters lying within and/or outside of the tolerance range.

5. Method in accordance with claim 1, characterized in that measured values for determining a tolerance range are welding times, to which a predetermined application of energy to components to be welded is assigned.

6. Method in accordance with claim 1, characterized in that measured values for determining a tolerance range are applications of energy to components to be welded, to which a predetermined welding time is assigned.

7. Method in accordance with claim 1, characterized in that as measured values for determining a tolerance range, periods of time are chosen, during which an established relative adjustment is made between sonotrode and counter electrode of a device for performing the ultrasound welding.

8. Method in accordance with claim 1, characterized in that as measured values for determining a tolerance range, periods of time are chosen, within which a predetermined weld force is applied.

9. Method in accordance with claim 1, characterized in that the distribution configuration of welds classified as good quality welds is calculated from the path between the mean of the measured values and the position of the tolerance range.

10. Method in accordance with claim 1, characterized in that mean values for the tolerance range are calculated from measured values assigned to the good quality welds.

11. Method in accordance with claim 1, characterized in that an initial tolerance range is determined from statistically supported values, and is changed based upon subsequent measured values obtained from welds.

* * * * *